UNITED STATES PATENT OFFICE.

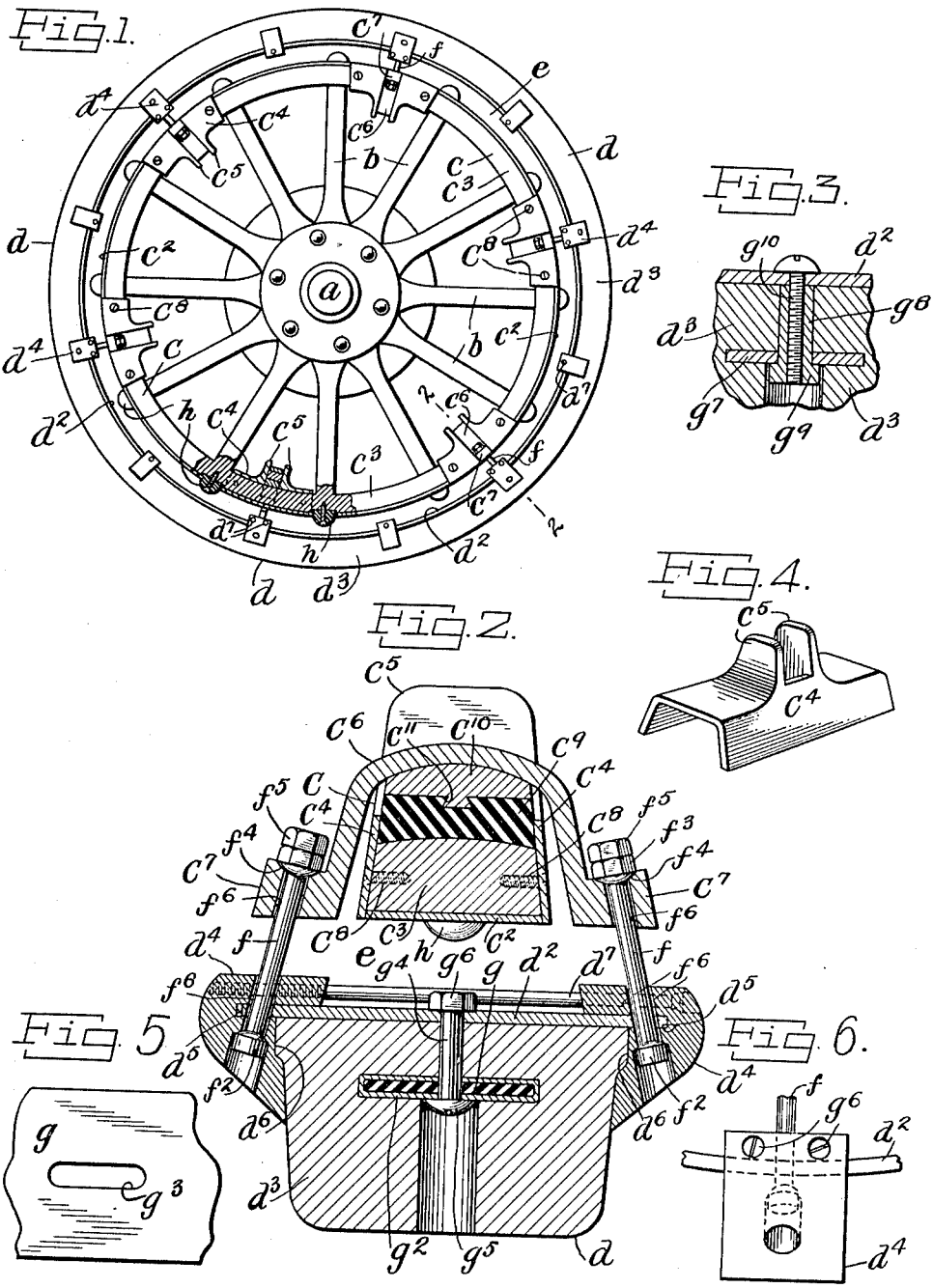

HERBERT CLIFFORD, OF JERSEY CITY, NEW JERSEY.

RESILIENT AND SUSPENSION WHEEL FOR VEHICLES.

1,066,797.  Specification of Letters Patent.  Patented July 8, 1913.

Application filed August 15, 1912. Serial No. 715,278.

*To all whom it may concern:*

Be it known that I, HERBERT CLIFFORD, a citizen of the United States, residing at Jersey City, in the county of Hudson and State of New Jersey, have invented a new and useful Improvement in Resilient and Suspension Wheels for Vehicles, of which the following is a specification, such as will enable those skilled in the art to which it appertains to make and use the same.

The object of the invention is to provide a wheel of the class specified which is simple in construction, strong and durable, and may be applied to vehicles of any kind or class, but which is particularly designed for use in connection with pleasure vehicles such as automobiles, carriages and the like.

The invention is fully disclosed in the following specification of which the accompanying drawing forms a part, in which the separate parts of my invention are designated by suitable reference characters in each of the views, and in which;—

Figure 1 is a side view showing a wheel made according to my invention, with part of the construction in section;—Fig. 2 a section on the line 2—2 of Fig. 1;—Fig. 3 a view similar to Fig. 2, but showing only part of the construction shown in said figure, and showing a modification;—Fig. 4 a perspective view of a detail of the construction which I employ and showing the same detached;—Fig. 5 a plan view of the detail shown in Fig. 2, and Fig. 6 a side view of a rim and tire clamp shown in section in Fig. 2, and a number of which are employed and shown in Fig. 1.

In the drawing forming part of this specification, particular reference being made to Figs. 1 and 2, I have shown a wheel comprising a hub portion $a$, spokes $b$, a main rim $c$ and a supplemental rim or tire member $d$ which incloses the rim $c$ and between which and said rim $c$ is an annular space $e$.

The main rim $c$ comprises an outer annular band plate $c^2$ of steel or other suitable metal and an inner annular member $c^3$ of wood, to which the band plate $c^2$ is secured, and mounted on the main rim member $c$ at regular intervals and preferably between the alternate spokes, as shown in Fig. 1, are saddles $c^4$ comprising body portions which are yoke-shaped in cross section and provided centrally with inwardly directed jaws $c^5$, between which are placed yokes $c^6$ the sides of which extend outwardly and are provided with lateral extensions $c^7$ through which are passed bolts $f$ by which the main rim member $c$ is secured to the outer supplemental rim or tire member $d$, as hereinafter described. The sides of the saddles $c^4$ overlap the part $c^3$ of the main tire member $c$, as shown in Figs. 1 and 2, and are secured thereto by screws $c^8$ or in any other way, and placed on the part $c^3$ of the main tire $c$ and partially inclosed by the sides of the saddles $c^4$ are resilient blocks $c^9$ of rubber or other suitable elastic material, and on which are placed bearings blocks $c^{10}$ of wood or other suitable material which are connected with the resilient blocks $c^9$ by a tongue and groove construction, as shown at $c^{11}$, or by any other suitable means, and the yokes $c^6$ bear on the blocks $c^{10}$ which are also inclosed by the saddles $c^4$ and said spokes.

The supplemental outer rim and tire member $d$ comprises an inner annular band member $d^2$ of steel or other suitable metal, and an outer tread member $d^3$ of rubber or other suitable material connected with the band member $d^2$, and said rim or tire member $d$ is provided at regular intervals, corresponding with the intervals of the saddles $c^4$ and yokes $c^6$ of the main inner tire member $c$, with side clamps $d^4$ the inner sides of which are provided with recesses $d^5$ to receive the side edges of the annular band member $d^2$, as shown in Fig. 2, and with other recesses $d^6$ to receive corresponding annular enlargements of the part $d^3$, as is clearly shown in said figure. The clamps $d^4$ are secured to the rim or tire member $d$ by transverse bolts $d^7$, and bolts $f$ are passed inwardly through the clamps $d^4$, and the lateral extensions $c^7$ of the yokes $c^6$, and are provided with heads $f^2$ which are countersunk in said clamps and the inner sides of which are rounded or semi-spherical in form, and the inner ends of the bolts $f$ are provided with nuts $f^3$ the inner sides of which are also rounded or semi-spherical in form and fit in corresponding recesses $f^4$ in the lateral extensions $c^7$ of the yokes $c^6$, and said bolts are also preferably provided at their inner ends with set or lock nuts $f^5$. The bolts $f$ pass through the outer edge portions of the annular band member $d^2$ of the supplemental rim and tire $d$, and the holes in said edges of said band member through which said bolts pass are larger than said bolts, as are also the corresponding holes in the clamps $d^4$ and in the lateral extensions $c^7$ of the yokes $c^6$, as clearly shown at $f^6$ so as to permit of the free movement of the bolts through said parts, or of said parts on said bolts.

Placed in the outer tread member $d^3$ is an annular plate $g$ of fiber or other suitable material inclosed by a casing $g^2$ of sheet metal, and these parts are provided with circumferential slots $g^3$, as shown in Fig. 6, through which are passed bolts $g^4$ by which the tread member $d^3$ is secured to the annular band member $d^2$, and in this operation the bolts $g^4$ are passed inwardly through the parts $d^3$ and $d^2$ and the heads $g^5$ thereof are countersunk in the part $d^3$, and the inner ends thereof are provided with nuts $g^6$ in the construction shown in Fig. 2. Instead of employing this construction, however, for securing the part $d^3$ to the annular band member $d^2$, I may employ that shown in Fig. 3, in which an annular plate $g^7$ is embedded in the part $d^3$, and the sleeve $g^8$ is passed inwardly through the part $d^3$ and provided with a head $g^9$, and a screw $g^{10}$ is passed outwardly through the band member $d^2$ and through said sleeve, and said sleeve is threaded to correspond with the thread on said screw.

With this construction it will be seen that the weight of the vehicle is suspended from the upper portion of the main rim member $c$ at all times and in all positions of the wheels of the vehicle, and the outer rim or tire member $d$ being elastic and being also movable toward and from the main inner rim member $c$ at all points, the body of the vehicle will be resiliently suspended, the annular space $e$ permitting of the free movement of the outer rim and tire member $d$ toward and from the inner main rim member $c$, and the rim and tire member $d^3$ will adjust itself to all unevenness of the road surface by reason of its elasticity or resiliency, and the movement of the yokes $c^6$ in the saddle $c^4$, this operation being also facilitated by the elastic blocks $c^9$ as will be readily understood.

I also preferably secure to the perimeter of the main rim member $c$ at regular intervals, elastic blocks or bearings $h$ on which the rim and tire member $d$ will impinge in the case of any unusual jolt or jar occasioned by abrupt elevations in the road surface over which the vehicle is passing, and these blocks or bearings may be countersunk in the annular band member $c^2$ of the main rim $c$, and be secured to said rim member by screws or bolts, or they may be connected with said rim member in any desired manner.

While I have described the side clamps $d^4$ as placed to correspond with the yokes $c^6$, it will be understood that the number of side clamps $c^4$ may not be the same as the number of said yokes, and in Fig. 1, only the alternate clamps $d^4$ are connected with the yokes $c^6$.

Having fully described my invention what I claim as new and desire to secure by Letters Patent, is:—

1. A wheel provided with a main rim member and an outer supplemental rim and tire member concentric to and spaced from said main rim member, said outer rim and tire member being provided at intervals with side clamps, yokes mounted on the main inner rim member and provided with lateral extensions and bolts passed through said clamps and through the extensions of said yokes.

2. A wheel provided with a main rim member and an outer supplemental rim and tire member concentric to and spaced from said main rim member, said outer supplemental rim and tire member being provided with side clamps and the main rim member being provided at intervals with saddles having inwardly provided jaws, yokes mounted in said saddles and the sides of which extend outwardly and are provided with lateral extensions, and bolts passed through said clamps and through the lateral extensions of said yokes.

3. A wheel provided with a main rim member and an outer supplemental rim and tire member concentric to and spaced from said main rim member, said outer supplemental rim and tire member being provided with side clamps and the main rim member being provided at intervals with saddles having inwardly projected jaws, yokes mounted on said saddles and the sides of which extend outwardly and are provided with lateral extensions, and bolts passed through said clamps and through the lateral extensions of said yokes, said saddles being also provided with resilient blocks which are placed therein and with bearing blocks placed on said resilient blocks and on which said yokes bear.

4. A wheel provided with a main rim member, a supplemental rim and tire member concentric to and spaced from said main rim member, and yokes mounted on the main rim member at intervals and the sides of which extend outwardly and are provided with lateral extensions, the supplemental outer rim and tire member being composed of an inner annular plate or band and an outer tread member connected therewith, and being also provided with side clamps which engage said band member and said tread member, and bolts passed through said clamps and through the lateral extensions of said yokes.

5. A wheel provided with a main rim member, a supplemental rim and tire member concentric to and spaced from said main rim member, saddles mounted at intervals on the main rim member and the sides of which inclose the main rim member, said saddles being provided with inwardly extending jaws, yokes mounted on said saddles and the sides of which are provided with lateral extensions, side clamps connected with the outer rim and tire member and bolts passed loosely through said clamps and through the lateral extensions of said yokes.

HERBERT CLIFFORD.

Witnesses:
 RALPH H. CRUMB,
 M. S. CRUMB.

Copies of this patent may be obtained for five cents each, by addressing the "Commissioner of Patents, Washington, D. C."